May 13, 1952  G. MUFFLY  2,596,274
ICE-CREAM FREEZER

Filed April 19, 1946  2 SHEETS—SHEET 1

INVENTOR.
Glenn Muffly.
BY
Harness, Dickey & Pierce.
ATTORNEYS.

May 13, 1952  G. MUFFLY  2,596,274
ICE-CREAM FREEZER
Filed April 19, 1946  2 SHEETS—SHEET 2
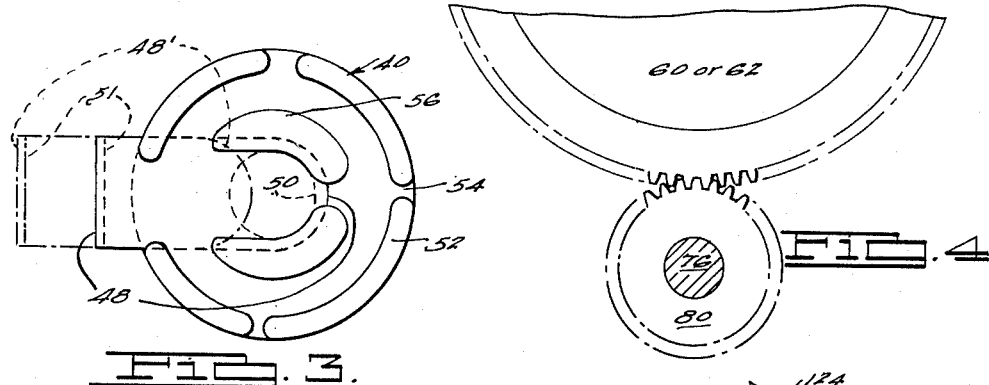
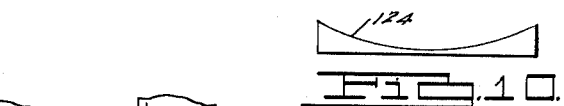
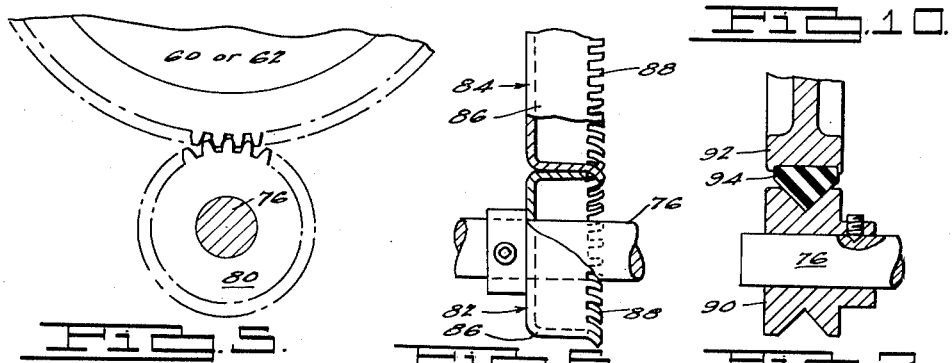
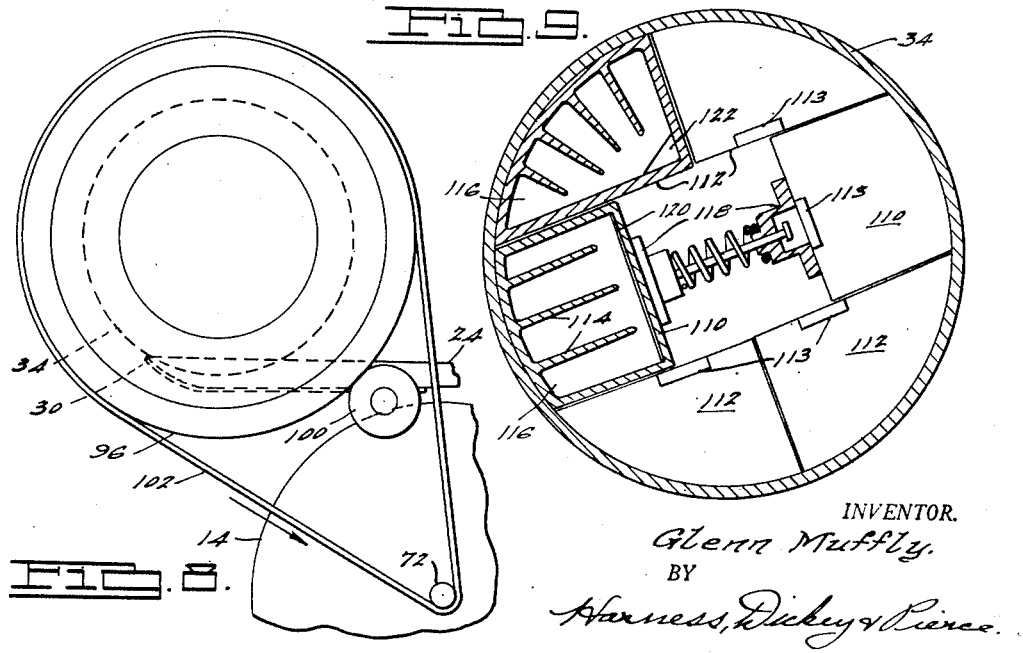
INVENTOR.
Glenn Muffly.
BY
Harness, Dickey & Pierce.
ATTORNEYS.

Patented May 13, 1952

2,596,274

UNITED STATES PATENT OFFICE 2,596,274

ICE-CREAM FREEZER

Glenn Muffly, Springfield, Ohio

Application April 19, 1946, Serial No. 663,477

5 Claims. (Cl. 62—114)

This invention relates to ice cream freezers and particularly to smaller sizes intended for household use and adapted for quantity production at low cost.

The ice cream freezer illustrated by the accompanying drawings is of the type wherein a solid refrigerant is contained within a drum and the ice cream mix is frozen on the periphery of this drum while it is rotated, the frozen cream then being scraped from the outside of the drum by means of a stationary scraper blade. The liquid mix feeds from an inverted bottle or reservoir to a pan, herein referred to as a fountain, maintaining a suitable liquid level in this fountain for wetting the cylindrical surface of the drum as it is slowly revolved on its horizontal axis.

An object of this invention is to provide convenient means for charging the drum with refrigerant.

Another object is to provide an apparatus which is easily cleaned and maintained in a sanitary condition.

A further object is to deliver the frozen ice cream directly to a pan of suitable proportions to fit an ice tray space in an ordinary mechanical refrigerator of household type for the purpose of hardening the frozen ice cream.

A still further object is to provide for the use of various refrigerants such as water ice and salt, carbon dioxide ice, brine ice or a cryohydrate.

Another object is to provide a fountain type of feed for distributing the mix over the surface of the drum, with means for shutting off the feed from the inverted bottle or container which holds the unfrozen mix. This shut-off means is adapted for attachment to an ordinary milk bottle so that the bottle can be readily inverted after filling with mix without spillage and the shut-off gate then opened so that the mix is fed by gravity to the pan into which the revolving drum dips.

Another object is to provide supporting and driving means for the drum in a manner which allows for lifting the drum from the balance of the apparatus without the necessity for any disconnecting of the supporting or driving mechanism.

A still further object is to provide an ice cream freezer in which no separate beater nor scraper is required.

An additional object is to provide means for obtaining the desired percentage of over-run without the usual beating operation for mixing air with the frozen material.

In the drawings:

Figure 3 is a separate detail drawing of the bottle cap and gate valve looking at this subassembly from the bottom as seen in Figure 2.

Figure 4 is a detail of one of the gears and its driving pinion seen in Figure 1, showing one type of gear tooth adapted for this use.

Figure 5 is another detail similar to Figure 4 illustrating another type of gear tooth adapted for use in the apparatus seen in Figures 1 and 2.

Figure 6 shows a still further modification of the same gears as adapted for manufacture from sheet metal.

Figure 7 is a detail drawing showing how friction drive members may be substituted for the gears in Figures 1 and 2.

Figure 8 illustrates the use of a belt drive substituted for the gears seen in Figures 1 and 2.

Figure 9 illustrates the use of cartridges of cryohydrate (frozen eutectic solution) or brine in the cylinder which is shown in Figures 1 and 2.

Figure 10 is an end view of a metal slab on which one of the above mentioned cartridges may be placed while freezing its contents preliminary to use.

Figure 1:
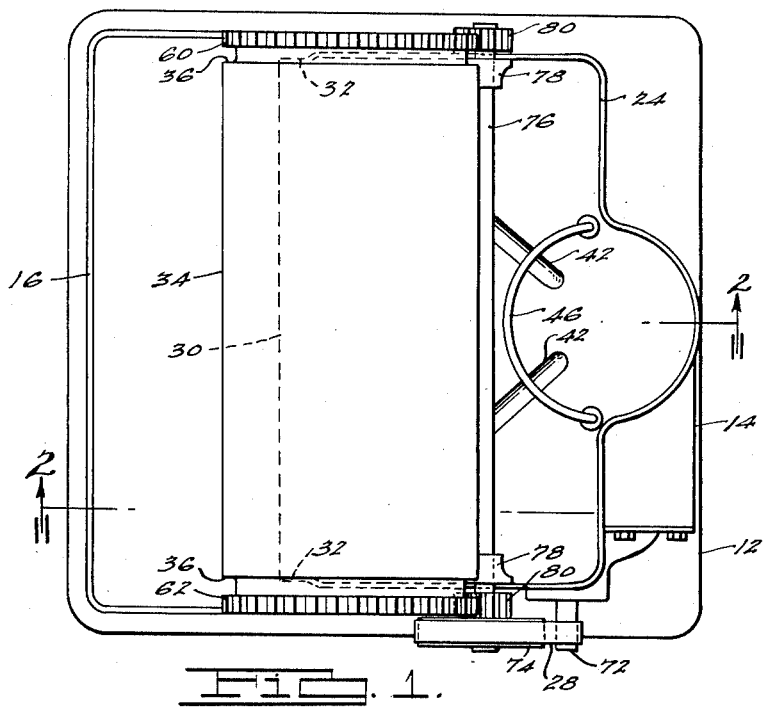
Figure 1 is a top view of the freezer.
Figure 2:
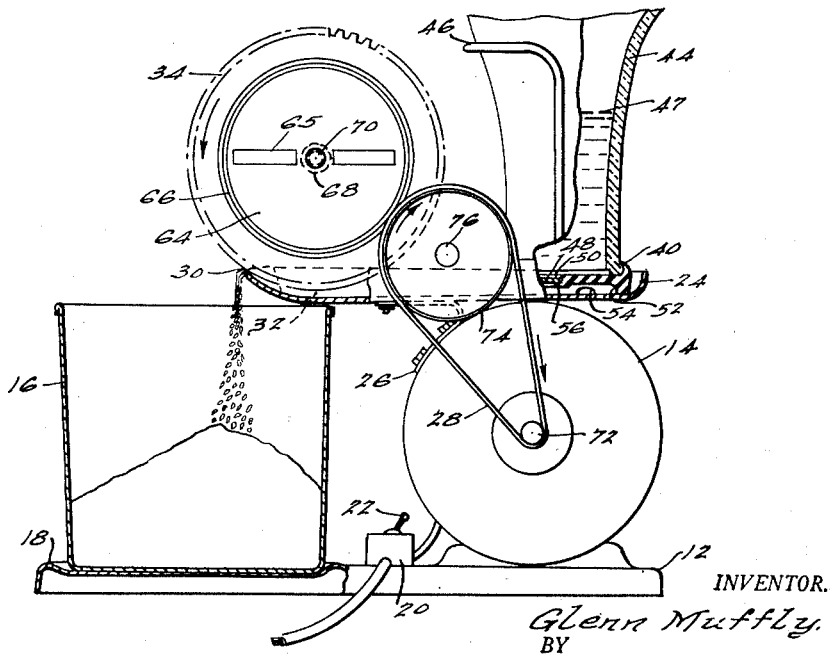
Figure 2 is a side view of the same apparatus seen in Figure 1.

Referring now to Figures 1 and 2, which are different views of the same apparatus, it will be seen that the base 12 supports a motor 14 which is rigidly attached thereto and the storage pan 16 which merely rests upon the base 12 and is prevented from sliding about thereon by the rib 18 which surrounds the surface upon which the pan rests. The motor is under control of the switch 20 operated by the lever 22. This switch may be mounted upon the motor itself or upon the base 12 as shown in Fig. 2.

The fountain 24 is preferably formed of a single pressed metal part as shown and supported by the motor through the medium of the bracket 26 upon which it is adjustable in a horizontal plane in a direction at right angles to the axis of the motor 14 for the purpose of tightening the belt 28.

The fountain 24 is formed with a sharp edge 30 which serves as a scraper blade. In addition the fountain supports or has formed integrally thereon two short scraper blades 32 which may be considered as continuations of the scraper 30, extending for a short distance around each end of drum 34 in scraping contact with the surfaces 36 to remove therefrom any of the frozen mix which adheres to these flat surfaces due to the slight depth that the drum dips in the liquid mix which is fed to the fountain 24, as herein-after described. The deeper portion of the fountain is formed with an inside radius slightly greater than the outside radius of the drum 34 so that a minimum volume of liquid will wet the drum through the required arc of drum surface. The shallower portion of the fountain is formed with a flat bottom upon which rests the bottle cap 40 as seen in Figure 2. From this flat area one or more channels 42 may extend to the deeper portion of the fountain as seen in Figure 1. Extending upwardly from that portion of the fountain adjacent to the area upon which the inverted bottle 44 rests, the guard 46 is provided to minimize the danger of accidental tilting of the bottle. This guard can be made to encircle the bottle if desired.

The bottle 44 as shown is assumed to be an ordinary one quart glass milk bottle into which the liquid mix 47 has been poured while the bottle was in its upright position. The cap 40, which is preferably molded from rubber or similar suitable material having the desired flexibility without the characteristic of imparting an objectionable taste or odor to substances coming in contact with it, is then placed upon the bottle and the metal gate valve 48 closed. After the filled bottle has been placed in its inverted position as seen in Figure 2, the gate valve 48 is withdrawn to position 48' (Figure 3) to open the passage 50 through which the liquid now flows into the fountain 24. The gate 48 may be bent at right angle as indicated by 51 in Figure 3 to form a handle.

It will be seen that the cap is formed with a rim 52 in which there are notches 54, allowing the mix to flow into the deeper portion of the fountain. The cap 40 is formed to provide a slideway for the gate 48 and therefore, includes a rib to accommodate this recess, but this rib 56 like the rim 52 has notches in it or is of such dimensions that it does not contact the bottom of the fountain 24, thus allowing for free flow of the mix away from the cap 40.

The level of the mix in the fountain 24 is determined by the level of the notches 54 and as liquid is removed from the fountain by the revolving drum 34 this level will be maintained by the well-known inverted bottle principle as air bubbles into the bottle. Due to surface tension and atmospheric effects the liquid level in the fountain will be slightly lower than the tops of the notches 54 in the inverted cap, as seen in Fig. 2, and will remain substantially constant.

The cylinder 34 is preferably formed of metal tubing or a rolled and welded sheet of metal. One end is permanently closed by means of the gear or roller 60 which is preferably brazed or soldered to the cylindrical shell of the drum. A similar gear or roller 62 is attached to the opposite end of the cylindrical shell but formed with an opening adapted to be closed by the cover 64 which may be threaded to fit therein. The cover 64 is provided with lugs 65 or a wrench-hold of suitable form to facilitate attachment and removal. This cover may optionally be held against its seat by a toggle clip or clamp instead of being threaded in the end of the drum. A gasket 66 may be used to insure tightness of the cover to prevent leakage of liquid from within the drum.

The cover 64 may be provided with a port 68 for the relief of internal pressure when carbon dioxide ice or other vapor-forming material is used as the refrigerant. This port may be closed by pressure relief valve, indicated at 70 in Figure 2 as threaded into the opening from the inside. A valve such as is used on pneumatic tires but formed with a male threaded base is suggested for this use or the port 68 may be closed externally by a thin metal flapper valve attached at one end to the cover 64. The spring tension holding either type of valve closed may be designed to require some predetermined vapor pressure within the drum 34 to open the valve. This provides for controlling the temperature of sublimation of the carbon dioxide ice.

The drive from the motor 14 to the drum 34 is as follows:

The belt 28 is driven by the pulley 72 which may be in on piece with the shaft of the motor. This belt drives the pulley 74 carried by the shaft 76 which turns in two bearings 78 attached to the fountain 24. This shaft carries two gear pinions or rollers 80 adapted to drive the gears or friction wheels 60 and 62 of the drum 34. This drum assembly, due to its own weight and the weight of its contents, is held against the two small gears or rollers 80 and also against the scraper blade 30 which is formed integrally with or attached to the fountain 24.

Various types of gears or friction wheels may be used in driving the drum. In the event that gears are employed any one of the types shown by Figures 4, 5 and 6 is suitable. In order that the gears may serve also as rollers to support the drum, the gears might be cut with wider-than-normal spaces between teeth or the tooth depth reduced so that the gear teeth bottom as shown in Figure 4. Another type of gear tooth which is adaptable for this use is one with an extra large pressure angle as shown in Figure 5. In this case the gears have no back lash and the weight of the drum holds the involute curves of the teeth on the larger gear against the involute curves of the teeth on the driving pinion.

Another gear type which meets the requirement of acting as rollers to maintain center distance and providing teeth for driving is shown in Figure 6. The pinion 82 and gear 84, which may replace a pinion 80 and gear 60 or 62, are stamped from sheet metal, each comprising a smooth cylindrical roller portion 86 in addition to teeth 88. The teeth in this case need not have true involute curves as they serve merely to prevent slippage while smooth rolling of the drum on the two pinions is assured by the cylindrical portions 86 of the gears and the pinions.

The toothed gear wheels and pinions of Figures 1 and 2 might alternatively be replaced with friction wheels 90 and 92 as shown by Figure 7. While these wheels might have flat faces if made of material providing sufficient friction to insure the proper driving of the drum 34, they are here shown as having a V-type of contact surfaces so that the pressure per unit area of the surfaces in contact is increased. The contact area and the friction may both be increased by the use of a slightly compressible material on the face of the driving wheel, on the driven wheel, as indicated at 94, or on both.

Another suitable drive which may be substituted for the gears shown in Figures 1 and 2 is obtained by employing a larger driven pulley 96 in place of the pulley 74 of Figures 1 and 2 and mounting this pulley directly on the drum as shown by Figure 8. In this case the direction of drum rotation is retained and the motor is arranged to rotate in the opposite direction as indicated by the arrows. In this arrangement the pinions 80 are replaced by plain rollers 100 which maintain the distance between the motor shaft and the axis of the drum. The belt 102 of Figure 8 or the belt 28 of Figure 2 may be tightened by adjusting the fountain 24 horizontally. For this purpose the holes for the screws or studs which attach the fountain to the bracket 26 are elongated in the bracket.

As explained above, the drum 34 is filled or partly filled with a refrigerant, preferably in solid form and having its melting point lower than the freezing point of the ice cream mix 47. This material may be water ice and salt, carbon dioxide ice, or other frozen material such as brine. The frozen material may be in loose form or may be contained within cartridges such as 110 and 112 shown in Figure 9. On each end of each cartridge is a lug 113 which holds it from contact with the drum end and is useful in prying the cartridge free for removal when frozen in place. These cartridges are preferably made of metal having good thermal conductivity and may be provided with internal fins 114 for the purpose of increasing the rate of heat transfer from the drum 34 to the frozen material 116. As shown in Figure 9, it will be seen that the cartridges are insertable through the opening in the end of the drum and that each cartridge has one surface forming a segment of a cylinder so that they will fit snugly against the inner surface of the drum 34 for good thermal conductivity.

After insertion of the segmental cartridges 112 and then 110 into the drum, the spring member 118 is inserted between the two cartridges 110 to hold them snugly against the cylindrical wall of the drum. Cartridges 110 are slightly tapered so that they wedge between the cartridges 112 as they are pushed outwardly to contact the cylinder wall. It will also be noted that the two flat sides of each cartridge 112 form an angle slightly greater than 90°. All cartridges 112 are identical, but two of them are inserted in the drum 34 other-end-first to fit in the opposite positions. When such cartridges are used it is not necessary to employ the cover 64, though it may be attached to minimize air circulation which would cause some loss of refrigerating effect to the atmosphere.

Cartridges 110 and 112 are nearly but not entirely filled with the eutectic freezing material 116, which is preferably frozen with the curved sides of cartridges down so that the air spaces 120 and 122 are farthest from the curved sides which contact the drum wall and carry the fins. This prevents the formation of voids in the frozen material near the curved heat-exchange walls. To facilitate freezing of the eutectic in this manner, it is proposed that several metal plates 124, of the section shown in Figure 10, be supplied for use in supporting the cartridges in a freezing zone of a refrigerator and providing better heat exchange between the curved wall of a cartridge and a refrigerated shelf.

The bearings 78 are preferably attached to the fountain 24 by means of bolts passing through horizontal slots in the side walls of the fountain. This allows for an adjustment of the shaft horizontally to vary the distance from the center of the drum 34 to the bottom of the fountain 24, thus changing the depth that the drum dips into the liquid mix in the fountain. This effect of varying the wetted area of the drum may also be accomplished by changing the depth of a notch 54, tilting the fountain or tilting the entire apparatus.

What I claim is:

1. In an ice cream freezer, a horizontally disposed drum, means for cooling said drum internally, a scraper blade arranged to contact said drum externally, means for rotating said drum, and roller means arranged to support a portion of the weight of said drum and its contents, substantially all of the remainder of said weight being supported by said scraper blade.

2. In an ice cream freezer, a drum adapted to be wetted externally by liquid mix, scraping means for removing said mix from said drum in frozen form, refrigerating means adapted to be placed within said drum, and means comprising a metallic cartridge containing a substance having its range of freezing temperatures substantially below the range of freezing temperatures of said mix, said cartridge being provided with internal fins to assist in the transfer of heat from said mix to said substance during the freezing of said mix and the coincidental melting of said substance.

3. In an ice cream freezer, a fountain, an inverted bottle adapted to contain a supply of liquid mix and having a mouth positioned to discharge said mix into said fountain, a closure for said mouth and serving to position said mouth relative to said fountain, a gate valve controlling flow of said mix, a drum adapted to be wetted externally by the liquid mix in said fountain, scraping means for removing said mix from said drum in frozen form, refrigerating means adapted to be placed within said drum, and means comprising a metallic cartridge containing a substance having its range of freezing temperatures substantially below the range of freezing temperatures of said mix, said cartridge being provided with internal fins to assist in the transfer of heat from said mix to said substance during the freezing of said mix and the coincidental melting of said substance.

4. In an ice cream freezer, a frame structure, a horizontally disposed drum carried by and rotatable relative to said structure and having an external cylindrically-shaped surface and having a hollow interior, a cartridge within said interior and having an external wall of substantially the same contour as the adjacent wall of said interior against which it is adapted to cooperate, a freezable material within said cartridge, a heat transfer fin extending from said cartridge wall into said material and having heat transfer engagement with said surface whereby said surface is maintained at a sufficiently low temperature to cause congelation of a liquid mix, a scraper carried by said structure arranged to contact said surface whereby the congealed mix is removed from said surface, a fountain carried by said structure and associated with said drum into which said surface extends whereby it will come in contact with a supply of liquid mix for transfer to said surface, a first revolvable member rigid with and adapted to rotate said drum, said member having a circular section with radially extending teeth, and a second revolvable member journaled for rotation on said structure and having a circular section with radially extending teeth which intermesh with said first named teeth, said first and second revolvable members acting to position said drum relative to said fountain and against said scraper.

5. The combination of claim 4 in which a plurality of said cartridges are utilized, said cartridges being of such contour that they mutually cooperate to substantially completely engage the entire peripheral surface of said interior, and in which means is provided for resiliently holding at least two of said cartridges against said peripheral surface.

GLENN MUFFLY.

REFERENCES CITED

The following references are of record in the file of this patent:

UNITED STATES PATENTS

| Number | Name | Date |
|---|---|---|
| Re. 8,455 | Albertson | Oct. 15, 1878 |
| 326,826 | Young | Sept. 22, 1885 |
| 436,265 | Roberts | Sept. 9, 1890 |
| 607,764 | Rankin | July 19, 1898 |
| 998,389 | Penick | July 18, 1911 |
| 1,423,172 | Anderson | July 18, 1922 |
| 1,467,019 | Tzibides | Sept. 4, 1923 |
| 1,473,907 | Hettrich | Nov. 13, 1923 |
| 1,526,101 | Sund | Feb. 10, 1925 |
| 1,705,933 | Lewis et al. | Mar. 19, 1929 |
| 1,783,864 | Vogt | Dec. 2, 1930 |
| 2,005,735 | Field | June 25, 1935 |
| 2,005,736 | Field | June 25, 1935 |
| 2,063,770 | Taylor | Dec. 8, 1936 |
| 2,063,771 | Taylor | Dec. 8, 1936 |
| 2,073,176 | Quinn | Mar. 9, 1937 |
| 2,082,439 | Bazzi | June 1, 1937 |
| 2,120,013 | Bates | June 7, 1938 |
| 2,152,467 | Crosby | Mar. 28, 1939 |
| 2,214,312 | Stovall | Sept. 10, 1940 |
| 2,238,512 | Uline | Apr. 15, 1941 |
| 2,303,664 | Short | Dec. 1, 1942 |
| 2,428,736 | Casmire | Oct. 7, 1947 |
| 2,446,614 | Sherick | Aug. 10, 1948 |
| 2,538,097 | Henderson | Jan. 16, 1951 |

FOREIGN PATENTS

| Number | Country | Date |
|---|---|---|
| 371,613 | Germany | Mar. 16, 1923 |